(No Model.)
G. BICKELHAUPT.
SKYLIGHT.
No. 416,251. Patented Dec. 3, 1889.
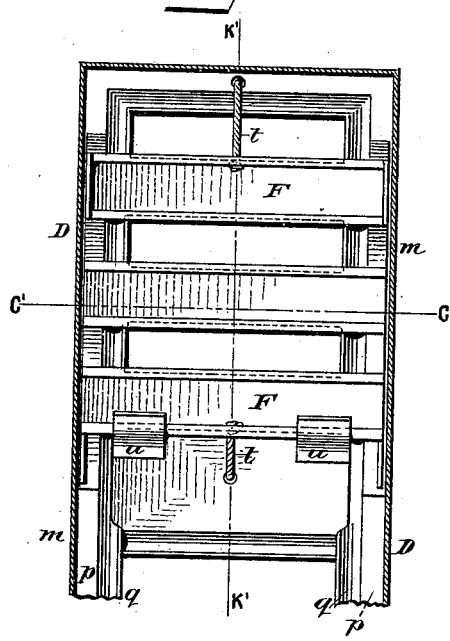
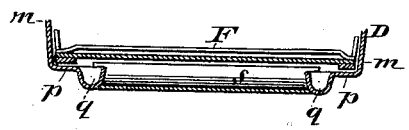
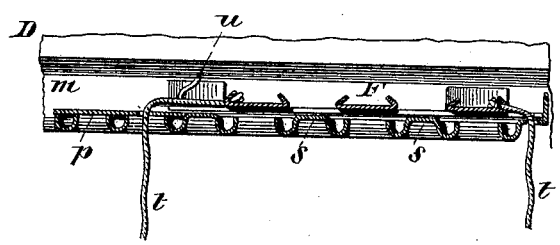

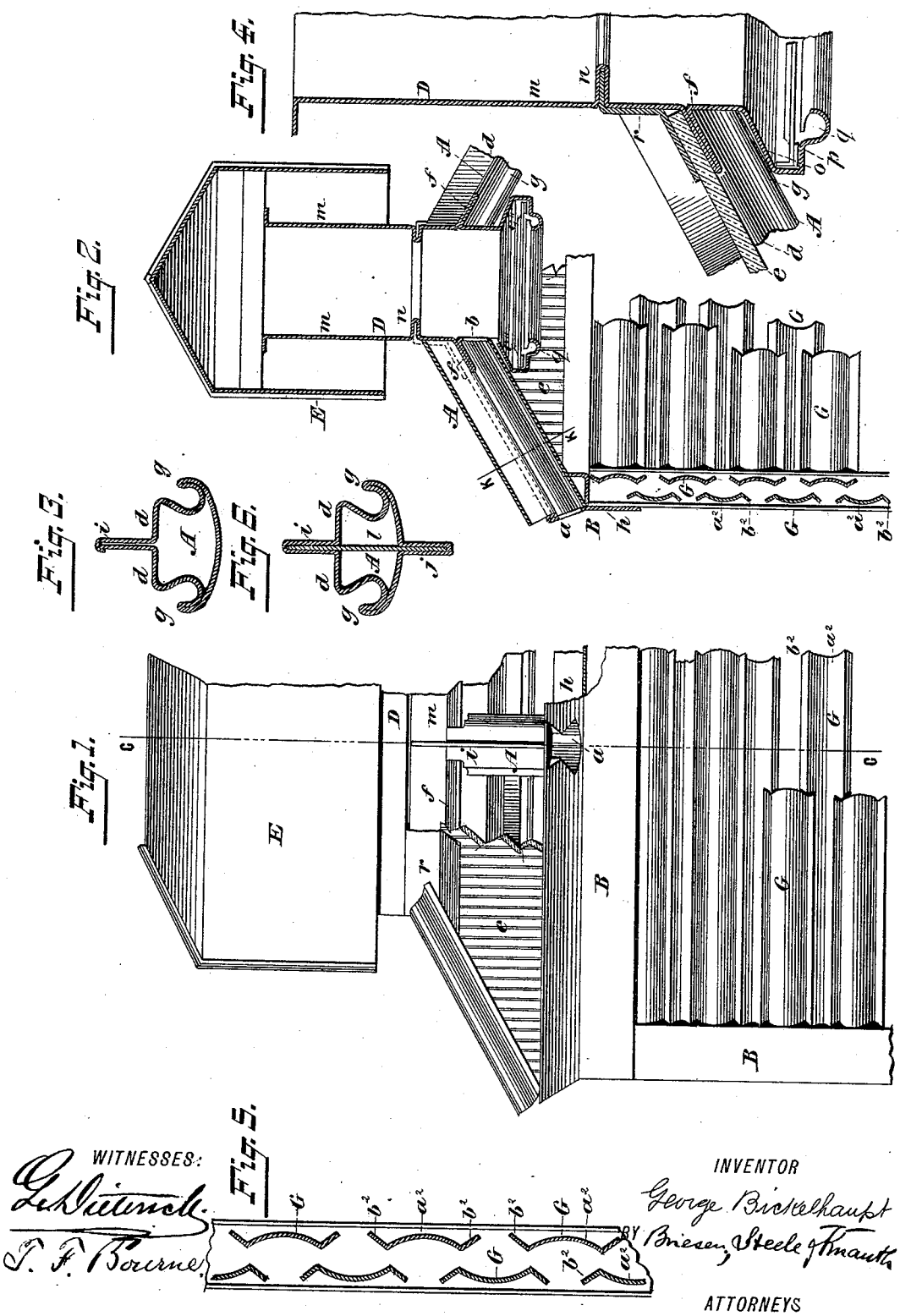

UNITED STATES PATENT OFFICE.

GEORGE BICKELHAUPT, OF NEW YORK, N. Y.

SKYLIGHT.

SPECIFICATION forming part of Letters Patent No. 416,251, dated December 3, 1889.

Application filed July 8, 1889. Serial No. 316,741. (No model.)

*To all whom it may concern:*

Be it known that I, GEORGE BICKELHAUPT, a resident of the city, county, and State of New York, have invented certain new and useful Improvements in Skylights, of which the following is a specification.

The object of my invention is to provide sundry improvements in skylights, whereby are combined together lightness with strength and whereby an increased circulation of air is effected.

The invention consists in the novel details of improvement and the combinations of parts that will be more fully hereinafter set forth, and then pointed out in the claims.

Reference is to be had to the accompanying drawings, forming part of this specification, wherein—

Figure 1 is a partly-broken side elevation of a portion of a skylight embodying my invention. Fig. 2 is a vertical transverse section of the same on the plane of the line $c\ c$, Fig. 1. Fig. 3 is detail section on the line $k\ k$, Fig. 2. Fig. 4 is an enlarged detail section of a portion shown in Fig. 2. Fig. 5 is an enlarged detail sectional view of part of the ventilating devices shown in Figs. 1 and 2. Fig. 6 is a modification of the part shown in Fig. 3. Fig. 7 is a horizontal section on the plane of the line $c''\ c''$, Fig. 2. Fig. 8 is a transverse section on the line $c'\ c'$, Fig. 7; and Fig. 9 is a longitudinal section on the line $k'\ k'$, Fig. 7.

Referring now to the accompanying drawings, the letter A represents a hollow bar that extends from the turret-frame B upwardly to the support D for the hood E. The hollow bar A, at the point where it connects with the turret-frame B, opens through said frame into the outer air at $a$, as clearly shown in Fig. 1, and at its inner part, where it connects with the support D, it opens into the same at $b$, as shown in Fig. 2. By this means a current of air is carried through the bar A into the upper part of the skylight, so as to cause the foul air from within to be drawn upward. The bar A, at its upper part, has horizontal sides $d$ to support the side edges of the glass covering $e$, the upper edge of said glass resting upon downwardly-projecting flanges $f$ from the support D, the lower edge of the glass $e$ being supported by the frame B. (See Figs. 1 and 2.)

As shown in Figs. 3 and 6, the sides of the bar A, below the horizontal sides $d$, are curved inwardly, as at $g$, whereby the water of condensation from the glass $e$ is caught and conducted to a gutter $h$ at the upper part of the frame B. The bar A is shown made of a single piece of thin metal, and in order to strengthen the same it is provided with an upwardly-projecting double rib $i$, (see Fig. 3,) that comes between two adjacent glasses $e$ when they rest upon the horizontal sides $d$.

In the modification shown in Fig. 6 the bar A is provided with a downwardly-projecting rib $j$, corresponding to $i$, between which ribs and through the center of the bar A a strip of metal $l$ is placed, so as to strengthen the bar A.

The support D for the hood E is constructed of side pieces $m$, each of which I prefer to make of a single piece of metal, as shown in Figs. 2 and 4. In said figures the side of the support D is doubled at $n$, so as to produce an inwardly-extending longitudinal rib, and below the same the flange $f$ is produced by bending the metal of the side $m$ outwardly and then inwardly again, as shown, and below the flange $f$ the metal of the side $m$ is bent downwardly and outwardly at $o$ beneath the bar A, then horizontally and inwardly at $p$, and then curved around to form a gutter $q$ to catch the water of condensation from the different parts of the skylight above the same. By making each side $m$ of the support D in a single piece and forming the different flanges and bends above described a firm structure is produced, which is comparatively cheap to manufacture.

In order to prevent water entering between the upper edge of the glass $e$ and the side $m$ of the support D, a shield $r$ is placed over the outer side of the glass at its upper edge, which shield extends upwardly and inwardly and enters the flange $n$, as shown in Figs. 2 and 4. By this means perfectly-tight joints are made, and the parts are not liable to become separated.

The support D for the hood E also acts as a support for a sliding ventilator F, which is guided on the horizontal part $p$ of the support D. (See Figs. 7, 8, and 9.)

The ventilator F consists of an open frame adapted to slide over a series of suitably-spaced cross-bars $s$, that extend across the support D from the sides $m$ $m$, as shown. The sliding frame F is provided at its opposite ends with cords or the like $t$, whereby when one cord is pulled the frame F will be moved so as to bring its cross-bars over the openings between the bars $s$ to close said openings, and when the opposite cord is pulled it draws the cross-bars on the frame F into line with the bars $s$, so as to permit air to pass through the ventilator, as in Fig. 7. A suitable stop $u$ limits the movement of sliding ventilator F. By providing the hood-support D with the sliding ventilator F economy of material and space is produced, while the whole structure is materially strengthened.

In order to create an upward draft, I prefer to construct the sides of the skylight beneath the glass $e$ and within the frame B in manner substantially as shown in Figs. 1, 2, and 5. In said figures two series of horizontal bars G are shown—an inner and outer series—the bars being placed alternately behind each other at a slight distance apart and secured to the frame B. These bars are curved at their middle portion $a^2$ into concavo-convex form and are flanged at their sides at $b^2$. The convex sides of the outer series of bars G face outward, the flanges $b^2$ projecting outwardly, while the concave sides of the inner series of bars G face outward, the flanges $b^2$ on the inner series of bars projecting inwardly. (See Figs. 2 and 5. The upper and lower edges of each bar G are at a slight distance from the bars above and below them, so that air may freely enter between said bars, the center or concave part of one bar G coming in line with the space between the other bars. By this arrangement of bars G a space is left between the outer and inner bars through which a current of air may pass in an upward direction, whereby foul air from the inside of the skylight can be drawn from between the bars G on the inner side and the fresh air can enter between the bars on the outer side; but rain and snow will be deflected outward by the convex form and flanges of each outer bar and by the concave face and flanges of each inner bar.

Only a portion of one side of the skylight is shown in the drawings; but it is evident that all the sides of the skylight may be constructed as before described and that the dimensions of the same and the number of bars A G may be varied to suit different requirements.

Having now described my invention, what I claim is—

1. The combination, with the frame B and the hood-support D, of the hollow bar A, extending from the frame B to the support D and having both ends open to the air for conducting air into the interior of the skylight while acting as a support for glass or the like, substantially as described.

2. The hollow open-ended bar A, having the horizontal support $d$ for the glass $e$, and the curved sides $g$ below the same for catching the water of condensation from the glass $e$, combined with the frame B and with the hood-support D, said bar A acting to conduct air into the interior of the skylight, substantially as described.

3. The hood-support D, bent inwardly to form the double flange $n$, outwardly to form the double flange $f$, and downwardly-extending support $o$, as specified.

4. The hood-support D, having the sides $m$ bent into the inwardly-extending flange $n$, the outwardly-extending flange $f$, the downwardly-extending part $o$, horizontal part $p$, and gutter $q$, substantially as described.

5. The combination of the frame B and hollow bar A with the hood-support D, having the side $m$ bent into the inwardly-extending flange $n$, outwardly-extending flange $f$, and downwardly-extending part $o$, and with the shield $r$ and glass $e$, said shield at one part entering the flange $n$ and extending over the upper part of the glass $e$, as specified.

6. The hood-support D, having the horizontal parts $p$ and cross-bars $s$, extending from said parts $p$, combined with the open frame F, that is carried by and adapted to slide on the horizontal parts $p$ of the support D to cover and uncover the bars $s$, substantially as described.

7. The frame B, having two series of bars G, each bar being curved at the center part $a^2$ and flanged at the edge $b^2$, the outer series of bars having their convex sides facing outwardly and their flanges projecting outwardly, the inner series of bars having their concave sides facing outwardly and their flanges $b^2$ extending inwardly, the concave sides of each outer bar G fronting the space between two inner bars, substantially as described.

GEORGE BICKELHAUPT.

Witnesses:
GEORGE YATES RENSHAW,
MAURICE BLACK.